United States Patent [19]

Clay

[11] 4,290,737
[45] Sep. 22, 1981

[54] RAM TYPE PUMP

[76] Inventor: Tymen Clay, 280 Huntingdon Ave., Stratford, Ontario, Canada, N5A 6P9

[21] Appl. No.: 78,884

[22] Filed: Sep. 25, 1979

[30] Foreign Application Priority Data

Sep. 14, 1979 [CA] Canada .................................. 335715

[51] Int. Cl.³ .......................................... F04B 15/02
[52] U.S. Cl. .................... 417/403; 417/489; 417/900
[58] Field of Search ............... 417/489, 490, 501, 403, 417/900

[56] References Cited

U.S. PATENT DOCUMENTS

| | | | |
|---|---|---|---|
| 1,362,767 | 12/1920 | Webb | 417/403 X |
| 1,441,097 | 1/1923 | Laughlin | 417/900 X |
| 2,319,981 | 5/1943 | Fitzgerald | 417/490 |
| 4,028,017 | 6/1977 | Kobiske | 417/900 X |

FOREIGN PATENT DOCUMENTS

| | | | |
|---|---|---|---|
| 615326 | 1/1927 | France | 417/900 |
| 699419 | 11/1953 | United Kingdom | 417/403 |

OTHER PUBLICATIONS

Ideal Underground Manure Pump, La Machinerie Ideal cie LTEE, St-Cesaire, Quebec, Canada.
TCM Power RAM, T. Clay Manufacturing Ltd., Stratford, Ontario, Canada.
Nesseth Open Pit Manure Pumps, Form , 168-10, 578, and 378-5, Nesseth, Inc. Barron, Wisconsin.
Patz Manure Movers, Form Pa-3451 1075 Rev., Patz Company, Pound, Wisconsin.
Badger Transfer Pumps, 557-E676, Badger Northland Inc., Kaukauna, Wisconsin.

Primary Examiner—Leonard E. Smith
Attorney, Agent, or Firm—Moss, Bensette, Thompson, Squires

[57] ABSTRACT

A ram type pump is disclosed for pumping manure from a collection area to a storage area. The pump has a hollow cylindrical housing having a transfer portion and an actuator portion. Manure is pushed through the transfer portion by a reciprocating cylindrical ram slidably located in the housing. The ram is operated by a hydraulic actuator located in the housing actuator portion. The housing actuator portion is releasably coupled to the transfer portion. This releasable coupling retains a removable bearing and seal assembly concentrically located for sliding, sealing engagement of the ram. The housing transfer portion includes a guide bearing assembly for concentric sliding engagement of the ram during reciprocating movement of the ram. Also, the housing actuator portion includes radially disposed guide means for quick axial alignment of the ram in the housing.

12 Claims, 10 Drawing Figures

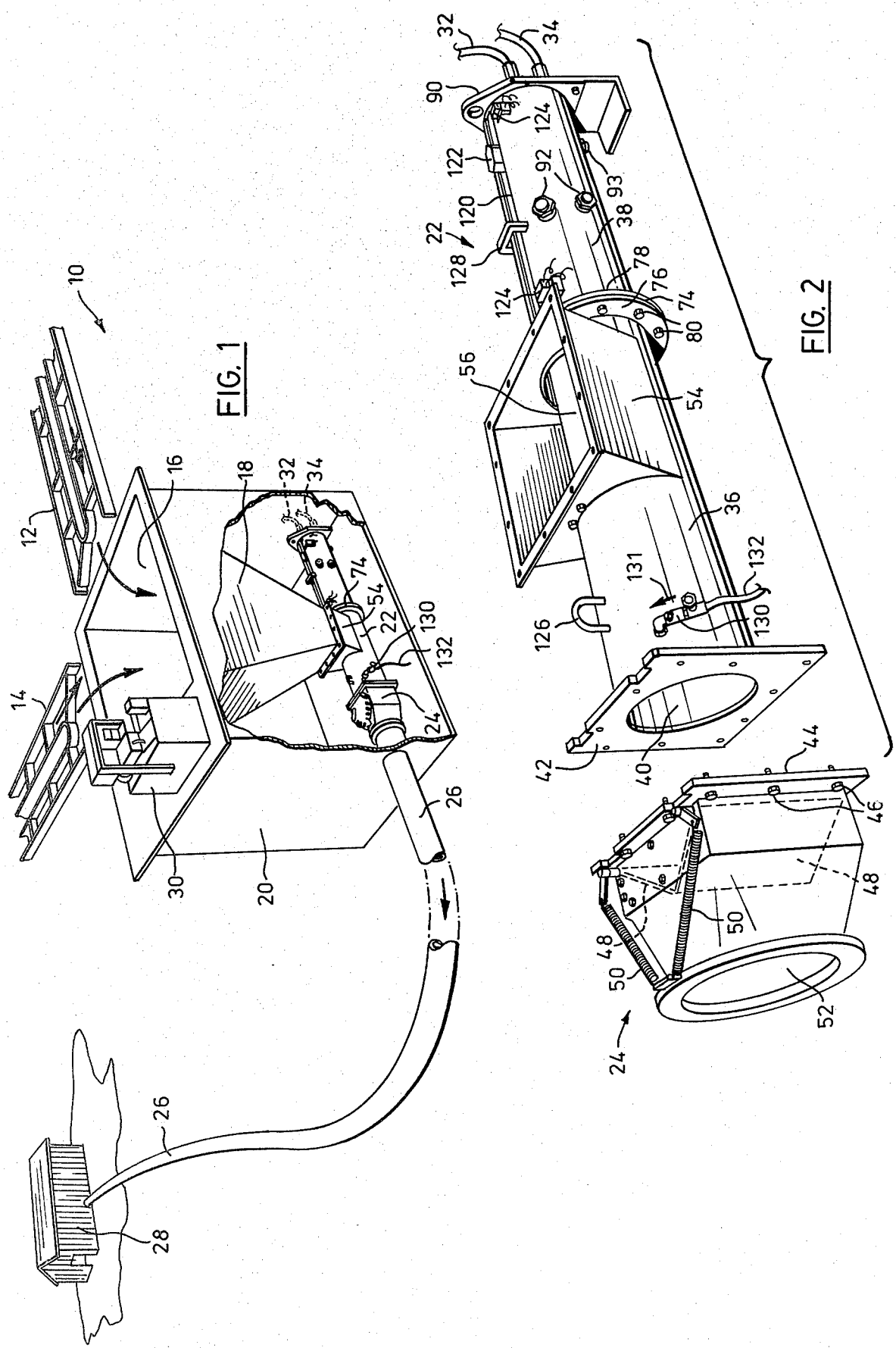

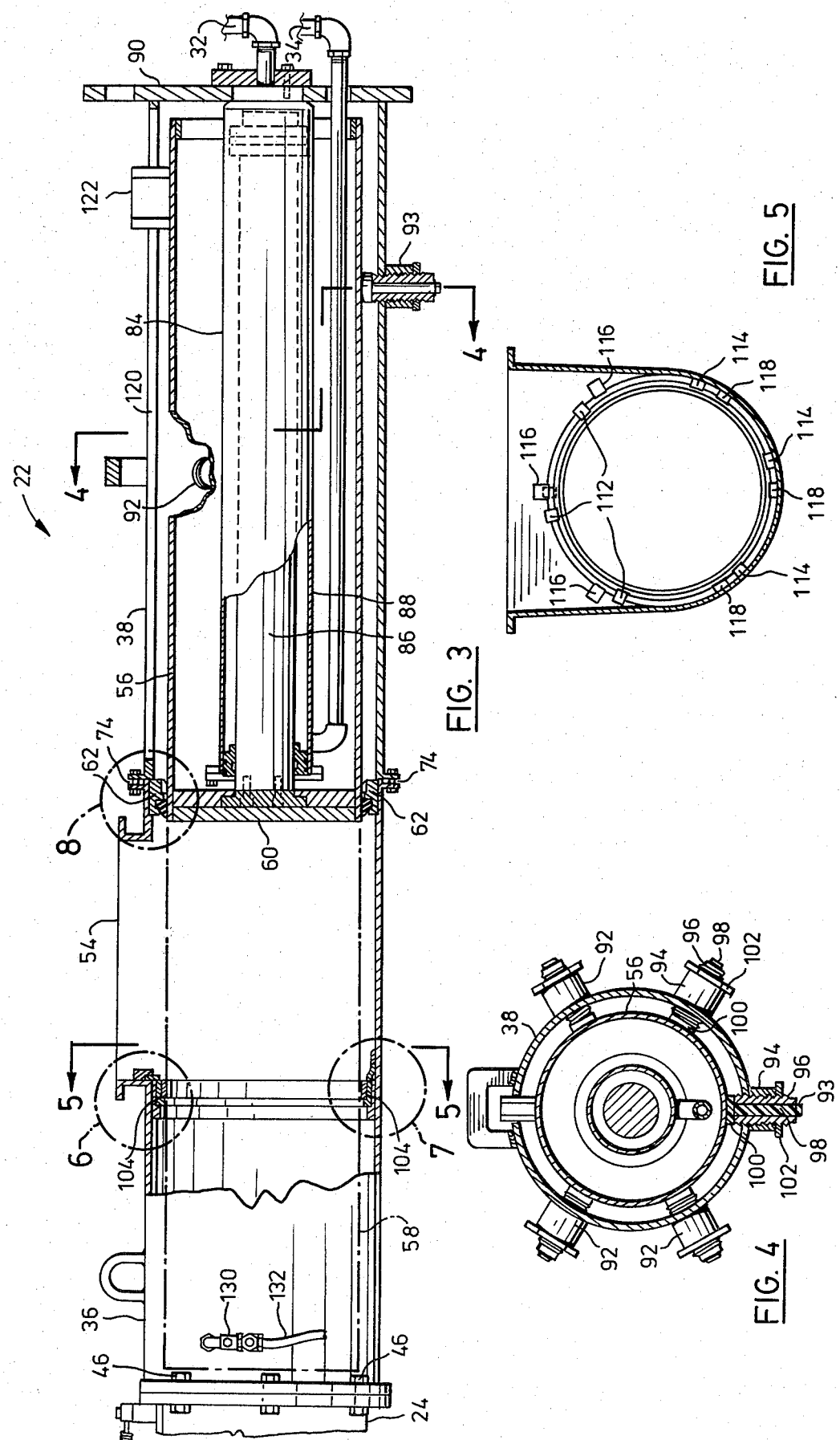

RAM TYPE PUMP

This invention relates to manure handling systems, and in particular to pumps for such systems.

Manure handling systems have been designed in the past for transferring manure from a barn or the like to a suitable storage facility, so that the manure may be more conveniently handled and preserved for subsequent use as fertilizer, etc. These systems typically include apparatus for collecting the manure, an underground pipeline to transfer the manure to the storage location, and pumping apparatus to receive the manure from the collecting apparatus and force it through the pipeline. The pumping apparatus is typically located in a pit or below grade level to facilitate the collection or supply of manure to the pumping apparatus.

It will be appreciated that manure is a material which requires considerable force or pressure to be pumped through a pipeline. For this reason, piston or ram type pumps have been used in the past in manure handling systems. A problem with the prior art pumps, however, is that they are difficult to service and maintain, especially where the pumps are located in manure pits. Time consuming repair or maintenance work can be extremely unpleasant under these conditions. Further, some of the prior art pumps have been prone to excessive wear or breakdown caused by piston misalignment.

The ram type pump of the present invention is constructed to make routine maintenance simple, quick and easy, and to reduce misalignment breakdown problems caused by high internal stresses.

According to the invention, there is provided a ram type pump for a manure handling system. The pump comprises a hollow, cylindrical pump housing having a transfer portion and an actuator portion. The transfer portion defines an outlet opening and an inlet hopper. A cylindrical ram is slidably located for reciprocating movement in the housing past the hopper, the ram being adapted to push manure entering the hopper through the transfer portion. A releasable coupling is connected between the transfer portion and the actuator portion at the junction thereof, the actuator portion thereby being separable from the transfer portion by releasing the coupling. Actuator means is located in the actuator portion connected between the ram and the actuator portion for reciprocating the ram. Also, guide means are located in the actuator portion for axial alignment of the ram in the housing.

A preferred embodiment of the invention will now be described, by way of example, with reference to the accompanying drawings, in which:

FIG. 1 is a schematic perspective view of a manure handling system incorporating the ram type pump of the present invention;

FIG. 2 is an exploded perspective view of the ram type pump and one-way outlet valve shown in FIG. 1;

FIG. 3 is a side elevational view, partly broken away, of the ram type pump shown in FIG. 2;

FIG. 4 is a transverse sectional view taken along lines 4—4 of FIG. 3;

FIG. 5 is a transverse sectional view taken along lines 5—5 of FIG. 3;

Figure 6:
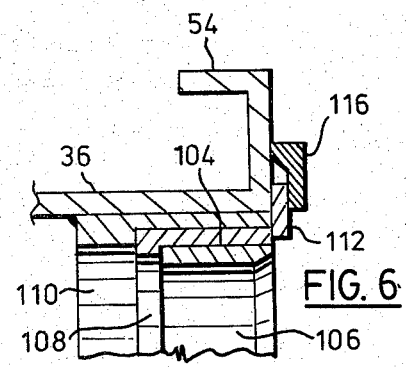
Figure 8:
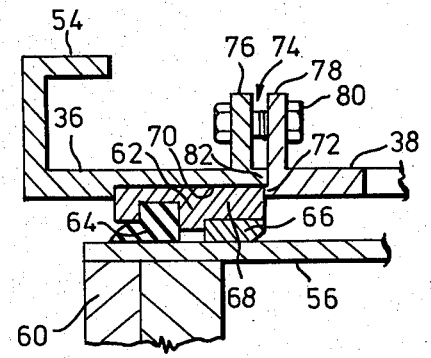
Figure 7:
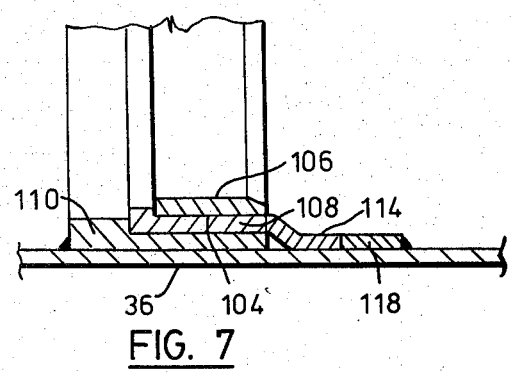
Figure 10:
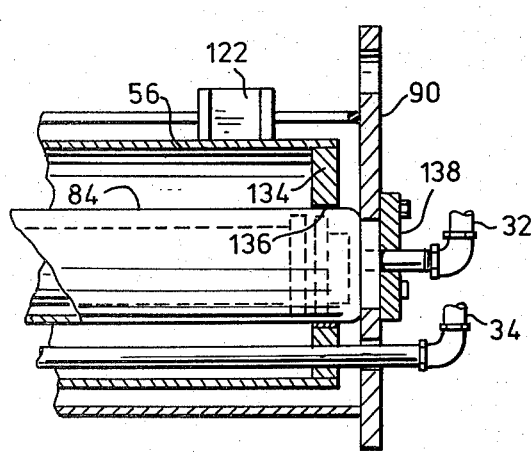
Figure 9:
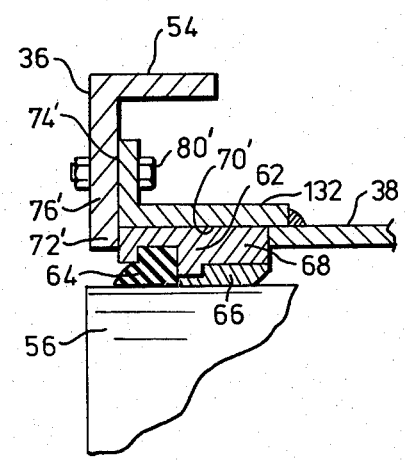

FIGS. 6 and 7 are exploded views of the portions of FIG. 3 indicated by respective chain dotted cycles 6 and 7;

FIG. 8 is an enlarged view of the portion of FIG. 3 indicated by chain dotted circle 8;

FIG. 9 is a sectional view similar to FIG. 8 showing an alternative embodiment of the releasable coupling and means for retaining the bearing and seal assembly; and FIG. 10 is a side elevational view, partly broken away, of an alternative embodiment of the guide means for axial alignment of the ram.

Referring to FIGS. 1 to 8 inclusive, a preferred embodiment of a manure handling system according to the present invention is generally indicated in FIG. 1 by reference numeral 10. System 10 includes conveyors 12, 14 which are normally installed in the floor of a bran, or the like. Conveyors 12, 14 collect and clean the barn floor of manure produced by the animals in the barn. This manure is deposited into a steel pit 16 as indicated by the arrows in FIG. 1. Pit 16 is located below the barn floor level and is typically installed in a suitable excavation. Pit 16 includes an inner funnel 18 and an outer shell 20. A ram type pump 22 is located inside shell 20 to receive manure from funnel 18.

Pump 22 delivers the manure through a one-way outlet valve 24 and forces the manure through a pipeline 26 to a suitable storage facility 28. Pipeline 26 is formed of rigid polyvinyl chloride ranging in diameter from 12 inches to 16 inches. Pipeline 26 is located underground well below the frost level so that is is not affected by weather.

Ram type pump 22 is operated by a hydraulic power unit 30 mounted on top of pit 16. Power unit 30 is not considered to be part of the present invention, and therefore will not be described in great detail. However, it will be appreciated that power unit 18 includes the usual hydraulic components, such as a motor driven pump, a hydraulic fluid reservoir, a control panel and pertinent filters and gauges. Power unit 30 is hydraulically coupled to ram type pump 22 by hydraulic lines 32, 34.

Referring in particular to FIGS. 2 to 8, ram type pump 22 includes a hollow cylindrical pump having a transfer portion 36 and an actuator portion 38. The housing transfer portion 36 defines an outlet opening 40 formed in an end plate 42. End plate 42 is connected to a similar transverse plate 44 forming part of one-way outlet valve 24. On assembly, end plate 42 is bolted to transverse plate 44 using threaded fasteners 46, so that one-way outlet valve 24 is removable.

One-way outlet valve 24 includes a pair of hinged gates 48, which are biased into a closed position as shown in FIG. 2 by springs 50. Outlet valve 24 has an output opening 52 through which the manure merges to enter pipeline 26. It will be appreciated that as the manure is forced out of the ram type pump outlet opening 40 and through one-way outlet valve 24, hinged gates 48 separate or open. Also, gates 48 swing closed as required to prevent the manure from backing up or passing backward through one-way valve 24.

The ram type pump housing transfer portion 36 also includes an inlet hopper 54, which is dimensioned to be connected to the bottom end of funnel 18 as shown in FIG. 1. Suitable threaded fasteners are used to couple inlet hopper 54 to funnel 18.

As seen best in FIGS. 2, 3 and 4, a cylindrical ram 56 is slidably located for reciprocating movement in the pump housing past hopper 54. This reciprocating movement is indicated by chain dotted lines 58 in FIG. 3. Ram 56 has a flat transverse end face 60 which pushes the manure entering inlet hopper 54 through the housing transfer portion 36 and out of housing outlet opening 40. Ram 56 is sufficiently long that the body or longitudinal wall of the ram closes the inlet opening of inlet hopper 54 as transverse end face 60 passes by inlet hopper 54, and this hopper opening remains closed throughout the remaining full stroke length of ram 56. This prevents manure from travelling behind ram 56 and entering housing actuator portion 38.

A bearing and seal assembly 62 (see FIG. 8) also helps prevent manure from passing behind ram 56 into housing actuator portion 38. Bearing and seal assembly 62 includes a polyurethane, annular gasket or seal 64 which wipes the outer surface of ram 56 and prevents manure from entering housing actuator portion 38. Bearing and seal assembly 62 also includes an annular, bronze bushing or bearing 66 for sliding contact with ram 56. Seal 64 and bearing 66 are mounted in an annular ring 68. Ring 68 is located in an inner recess 70 which is concentric with the pump housing and ram 56. Annular ring 68 is held in position by an annular rim 72 formed on housing actuator portion 38. Rim 72 engages and retains annular ring 68 in position, but upon separation of the housing transfer and actuator portions 36, 38, bearing and seal assembly 62 may be removed or replaced.

Housing transfer and actuator portions 36, 38 are held together by a releasable coupling 74 in the form of a pair of concentric annular flanges 76, 78 held together by threaded fasteners 80. Annular flange 76 is formed as part of housing transfer portion 36, and annular flange 78 is formed as part of housing actuator portion 38. As seen best in FIG. 8, annular flange 76 is spaced from the end of housing transfer portion 36 to define a projecting rim 82, and the annular rim 72 of housing actuator portion 38 fits just inside projecting rim 82. This provides for positive location and alignment of the housing transfer and actuator portions 36, 38 and also permits flanges 76, 78 to be drawn together by fasteners 80 to releasably couple the respective housing portions together.

Ram type pump 22 also includes a hydraulic actuator or cylinder 84 axially mounted inside housing actuator portion 38, the cylindrical ram thus being concentrially located about hydraulic cylinder 84. Hydraulic cylinder 84 includes a piston 86 which is connected to the transverse end face 60 of cylindrical ram 56. Hydraulic cylinder 84 also includes an outer cylinder portion 88 which is connected to housing actuator portion 38 by being connected to a transverse end plate 90 located on the outer end of housing actuator portion 38. It will be appreciated that as hydraulic fluid pressure is applied to hydraulic line 32, pistons 86 will be intended causing ram 56 to move to the left as seen in FIG. 3. Similarly, as hydraulic fluid pressure is applied to hydraulic line 34, piston 86 will be retracted causing ram 56 to move to the right as seen in FIG. 3. This reciprocating movement of ram 56 pushes the manure through housing transfer portion 36. Hydraulic cylinder 84 typically has a bore of $4\frac{1}{4}$ inches and a stroke of 26 to 40 inches and is designed to operate at approximately 9 strokes per minute. This produces about 15,000 lbs. thrust, and with a 10 inch diameter cylindrical ram, the pump will deliver between 1.4 and 1.8 cu. ft. of manure per stroke of the ram. With a 14 inch diameter cylindrical ram 56, ram type pump 22 will deliver between 2.9 and 4.0 cu. ft. of manure per stroke of the ram.

Cylindrical ram 56 is primarily aligned axially by a plurality of bearing pads 92, 93 located in the housing actuator portion extending radially inwardly to slidingly engage the cylindrical ram. Bearing pads 92 are arranged in a transverse plane approximately in the centre of housing actuator portion 38. Bearing pad 93 is located about 12 inches from pads 92 and about 10 inches from transverse end plate 90. Bearing pads 92, 93 are identical in configuration. As seen best in FIG. 4, bearing pads 92, 93 include an outer cylindrical portion 94 having internal threads. This outer cylindrical portion 94 is rigidly connected to the housing actuator portion 38. A threaded sleeve 96 is threaded into outer cylindrical portion 94, so that rotation causes sleeve 96 to move axially, and radially with respect to cylindrical ram 56. A nylon insert 98 is slidably located in threaded sleeve 96, and insert 98 has an enlarged head 100 which is sandwiched between the outer surface of ram 56 and the inner end of sleeve 96. It will be appreciated that as threaded sleeve 96 is rotated, nylon insert 98 will be moved radially, and that by manipulating all of the bearing pads 92, 93 cylindrical ram 56 may be aligned axially. Lock nuts 102 threaded onto threaded sleeves 96 to maintain the position of the nylon inserts 98 once ram 56 has been aligned.

The housing transfer portion 36 also includes a guide bearing assembly 104 (see FIGS. 6 and 7) which is somewhat similar to bearing and seal assembly 62, except that guide bearing assembly 104 has no polyurethane seal. Guide bearing assembly 104 has an inner, annular bronze bushing or bearing 106 which is mounted in an annular ring 108, which in turn is mounted in an annular sleeve 110. Sleeve 110 is rigidly connected to the inside surface of housing transfer portion 36, and guide bearing assembly 104 is axially slidably mounted in sleeve 110. Guide bearing assembly 104 is held in position by a plurality of radially disposed tabs 112, 114 attached to annular ring 108 (see FIG. 5). Tabs 112 are located behind respective retainers 116, 118 attached to the housing transfer portion 36. Guide bearing assembly 104 may be removed by rotating same until tabs 112, 114 are not located behind retainers 116, 118 as indicated in FIG. 5. Similarly, guide bearing assembly 104 is retained in position by rotating same until the tabs are behind the retainers as indicated in FIGS. 6 and 7. It will be appreciated that guide bearing assembly 104 is removably mounted in the housing transfer portion 36 adjacent to inlet hopper 54, and that the guide bearing assembly 104 defines a circular opening for a concentric, sliding engagement of the cylindrical ram 56 upon reciprocating movement of the ram. Bearing pads 92 are located longitudinally along housing actuator portion 38 such that the bearing pads still engage the cylindrical ram as the ram enters guide bearing assembly 104. This ensures that the ram will be aligned axially throughout the full extent of its travel.

Housing actuator portion 38 defines an upper longitudinal opening 120 therein, and a cam 122 is attached to cylindrical ram 56 to project or extend through opening 120. Cam 122 is located adjacent to one end of ram 56 to engage suitable limit switches 124 positioned at the extreme ends of the stroke of travel of cam 122. Limit switches 124 are connected to power unit 30 to control the operation of the pump. Suitable U-shaped lifting brackets 126, 128 are attached to respective housing portions 36, 38 for manipulating these housing portions. A vacuum relief valve 130 is coupled to the housing transfer portion 36 between hopper 54 and outlet opening 40. Relief valve 130 is a non-return or check valve, permitting one-way flow through the valve only in the direction of arrow 131 in FIG. 2. This reduces the vacuum which would otherwise be created upon retraction of ram 56 and which would ordinarily produce a load on hydraulic cylinder 84. Valve 130 closes as ram 56 is extended, to prevent manure from passing out of housing transfer portion 36 through valve 130. An extension tube 132 is connected to vacuum relief valve 130 to extend to the bottom of shell 20, so that if there is any moisture accumulation in the bottom of pit 16, relief valve 130 will produce a vacuum or revive suction upon retraction of ram 56 to draw the moisture into the housing and remove same along with the manure.

Referring next to FIG. 9, an alternative method of retaining bearing and seal assembly 62 is shown. In the embodiment shown in FIG. 9, primed reference numerals are used to indicate elements similar to the structure shown in FIG. 8. In the embodiment of FIG. 9, the bearing and seal assembly 62 is still located adjacent to releasable coupling 74'. However, the concentric inner recess 70' is formed by an L-shaped collar 132 attached to housing actuator portion 38. The concentric inner recess 70' is therefore formed in housing actuator portion 38. The annular rim 72' retaining bearing and seal assembly 62 in position is now part of the housing transfer portion 36.

Referring lastly to FIG. 10, another embodiment of guide means is disclosed for axially aligning ram 56. In the embodiment shown in FIG. 10, bearing pads 92 would be replaced by a transverse end plate 134 attached to the end of cylindrical ram 56 remote from the housing transfer portion 36. The end plate 134 defines a central opening 136 for sliding concentric engagement of the outer surface of hydraulic cylinder 34. In this embodiment, cylindrical ram 56 is aligned by relocating a retaining plate 138 which connects hydraulic cylinder 84 to transverse end plate 90. End plate 134 and retaining plate 138 thus form guide means for axial alignment of ram 56 in the pump housing.

Having described preferred embodiments of the invention, it will be appreciated that various other modifications may be made to the structure described. For example, different types of one-way outlet valves 24 could be employed. Also, other types of bearing and seal assemblies, or plain bearing assemblies, could be employed if desired. In particular, the structure shown in FIG. 9 would similarly be used to retain guide bearing assembly 104 shown in FIGS. 6 and 7.

It will be appreciated from the above that the tubular construction of the pump housing and the particular releasable coupling used to join the housing portions provide a ram type pump which is very simple and easy to maintain. All of the components which are subject to wear can be very quickly replaced. Further, the tubular housing structure enables the ram type pump to withstand extremely high internal pressures or stresses, and yet these stresses are distributed evenly to reduce any problems or breakdowns caused by ram misalignment.

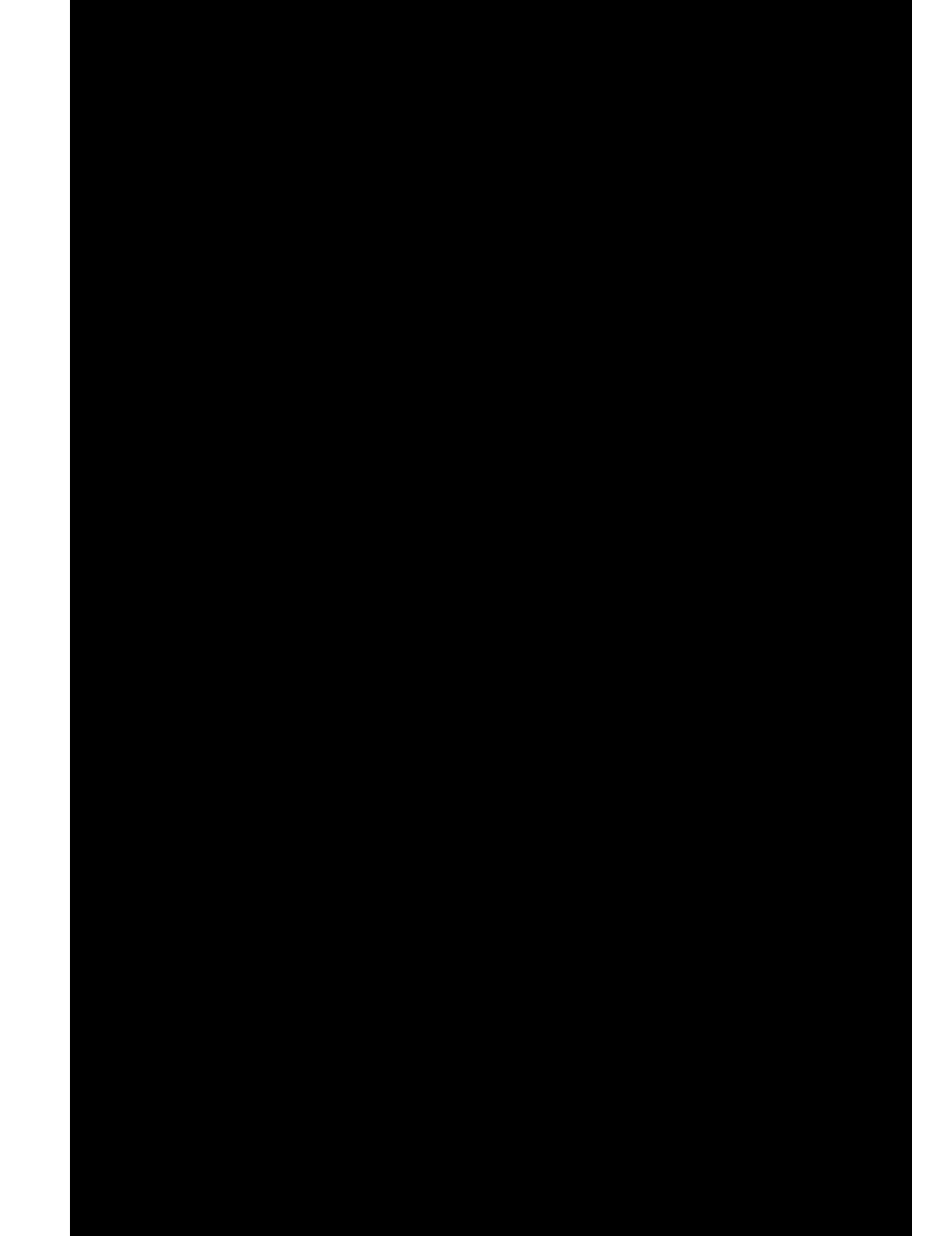

What I claim as my invention is:

1. A ram type pump for a manure handling system, said pump comprising:
   a hollow, cylindrical pump housing having a transfer portion and an actuator portion, the transfer portion defining an outlet opening and an inlet hopper;
   a cylindrical ram slidably located for reciprocating movement in the housing past the hopper, the ram being adapted to push manure entering the hopper through the transfer portion;
   a releasable coupling connected between said transfer portion and said actuator portion at the junction thereof, the actuator portion thereby being separable from the transfer portion by releasing said coupling;
   actuator means located in said actuator portion connected between the ram and said actuator portion for reciprocating the ram; and
   guide means located in said actuator portion for axial alignment of the ram in the housing, said guide means comprising a plurality of bearing pads extending radially inwardly from said actuator portion to slidingly engage the cylindrical ram.

2. Apparatus as claimed in claim 1 wherein said actuator means comprises a hydraulic cylinder axially mounted inside said housing actuator portion, the cylindrical ram being concentrically located about the hydraulic cylinder.

3. Apparatus as claimed in claim 1 wherein said bearing pads are adjustable radially for alignment of the ram.

4. Apparatus as claimed in claim 1 and further comprising a guide bearing assembly removably mounted in the housing transfer portion adjacent to said inlet hopper, the guide bearing assembly defining a circular opening for concentric, sliding engagement of the cylindrical ram upon reciprocating movement of the ram.

5. Apparatus as claimed in claim 1 wherein the housing actuator portion defines a longitudinal opening therein, and further comprising a cam attached to the cylindrical ram and extending through said opening, said cam being located adjacent to one end of the ram.

6. Apparatus as claimed in claim 1 and further comprising a one-way outlet valve connected to the housing transfer portion at said outlet opening.

7. Apparatus as claimed in claim 1 and further comprising a vacuum relief valve coupled to the housing transfer portion between the hopper and said outlet opening.

8. A ram type pump for a manure handling system, said pump comprising:
   a hollow, cylindrical pump housing having a transfer portion and an actuator portion, the transfer portion defining an outlet opening and an inlet hopper;
   a cylindrical ram slidably located for reciprocating movement in the housing past the hopper, the ram being adapted to push manure entering the hopper through the transfer portion;
   a releasable coupling connected between said transfer portion and said actuator portion at the juntion thereof, the actuator portion thereby being separable from the transfer portion by releasing said coupling;
   actuator means located in said actuator portion connected between the ram and said actuator portion for reciprocating the ram;
   guide means located in said actuator portion for axial alignment of the ram in the housing; and
   a bearing and seal assembly removably mounted in the pump housing adjacent to said releasable coupling, said assembly being concentrically located around the cylindrical ram for sliding, sealing engagement of the ram, thereby preventing manure from entering the housing actuator portion.

9. Apparatus as claimed in claim 8 wherein said guide means comprise an end plate attached to the cylindrical ram remote from the housing transfer portion, the end plate defining a central opening for sliding concentric engagement of the hydraulic cylinder.

10. Apparatus as claimed in claim 1 wherein said bearing and seal assembly includes an annular ring, one